(12) United States Patent
Lin

(10) Patent No.: US 11,042,461 B2
(45) Date of Patent: Jun. 22, 2021

(54) MONITORING MULTIPLE SYSTEM INDICATORS

(71) Applicant: Advanced New Technologies Co., Ltd., George Town (KY)

(72) Inventor: Jianbin Lin, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/390,062

(22) Filed: Apr. 22, 2019

(65) Prior Publication Data

US 2020/0142800 A1 May 7, 2020

Related U.S. Application Data

(63) Continuation of application No. PCT/CN2018/113591, filed on Nov. 2, 2018.

(51) Int. Cl.
| | | |
|---|---|---|
| *G06F 11/30* | (2006.01) | |
| *G06N 3/04* | (2006.01) | |
| *G06F 11/34* | (2006.01) | |
| *G06Q 40/08* | (2012.01) | |

(52) U.S. Cl.
CPC ........ *G06F 11/3055* (2013.01); *G06F 11/302* (2013.01); *G06F 11/3089* (2013.01); *G06F 11/3409* (2013.01); *G06N 3/049* (2013.01); *G06Q 40/08* (2013.01)

(58) Field of Classification Search
None
See application file for complete search history.

(56) References Cited

U.S. PATENT DOCUMENTS

| | | | | |
|---|---|---|---|---|
| 7,769,667 | B2* | 8/2010 | Glinberg | G06Q 40/00 705/37 |
| 7,813,944 | B1* | 10/2010 | Luk | G06Q 10/10 705/4 |
| 10,002,322 | B1* | 6/2018 | Ravindran | G06Q 10/04 |
| 10,043,211 | B2* | 8/2018 | Joshi | G06F 11/3409 |
| 10,074,038 | B2 | 9/2018 | Hsieh et al. | |
| 2002/0049625 | A1* | 4/2002 | Kilambi | G06F 30/00 706/62 |
| 2011/0015948 | A1* | 1/2011 | Adams | G06Q 10/087 705/4 |

(Continued)

FOREIGN PATENT DOCUMENTS

| | | |
|---|---|---|
| CN | 108062561 | 5/2018 |
| CN | 108073497 | 5/2018 |

(Continued)

OTHER PUBLICATIONS

Azzouni, Abdelhadi & Pujolle, Guy. (2017). A Long Short-Term Memory Recurrent Neural Network Framework for Network Traffic Matrix Prediction (Year: 2017).*

(Continued)

*Primary Examiner* — Lina M Cordero
(74) *Attorney, Agent, or Firm* — Fish & Richardson P.C.

(57) ABSTRACT

Multiple system indicators to be monitored in a computing system are determined. Training data based on historical data of the multiple system indicators is obtained. A long short-term memory (LSTM) model is trained using the training data. The multiple system indicators are monitored in the computing system based on the LSTM model.

15 Claims, 3 Drawing Sheets

(56) References Cited

U.S. PATENT DOCUMENTS

| | | | |
|---|---|---|---|
| 2016/0034812 A1* | 2/2016 | Gibson | G06N 3/08 706/25 |
| 2016/0299938 A1* | 10/2016 | Malhotra | G06K 9/6284 |
| 2016/0379309 A1* | 12/2016 | Shikhare | G06Q 40/08 705/4 |
| 2018/0189647 A1 | 7/2018 | Calvo et al. | |
| 2018/0268489 A1* | 9/2018 | McDonnell | G06Q 40/08 |
| 2018/0276541 A1* | 9/2018 | Studnitzer | G06Q 40/04 |
| 2018/0314938 A1* | 11/2018 | Andoni | G06N 3/086 |
| 2019/0057317 A1* | 2/2019 | Malhotra | G01M 15/14 |
| 2019/0087720 A1* | 3/2019 | Chakraborty | G06N 3/08 |
| 2019/0095313 A1* | 3/2019 | Xu | G06N 20/00 |
| 2019/0122144 A1* | 4/2019 | Kabeya | G06N 20/00 |
| 2019/0125287 A1* | 5/2019 | Itou | A61B 5/055 |
| 2019/0147239 A1* | 5/2019 | Jin | G06K 9/00456 382/173 |
| 2019/0327259 A1* | 10/2019 | DeFelice | H04L 63/1433 |
| 2019/0354835 A1* | 11/2019 | Mac | G06K 9/00335 |
| 2020/0005333 A1* | 1/2020 | Lutich | G06Q 30/018 |
| 2020/0111054 A1* | 4/2020 | Marinescu | G06F 17/18 |

FOREIGN PATENT DOCUMENTS

| | | |
|---|---|---|
| CN | 108564227 | 9/2018 |
| CN | 108564228 | 9/2018 |
| CN | 108596229 | 9/2018 |
| CN | 108628281 | 10/2018 |
| JP | 2016516471 | 6/2016 |
| JP | 2016173782 | 9/2016 |
| JP | 2016201088 | 12/2016 |
| JP | 2017009362 | 1/2017 |
| KR | 101637458 | 7/2016 |
| KR | 20180029543 | 3/2018 |
| KR | 20180054992 | 5/2018 |

OTHER PUBLICATIONS

Q. Zhuo, Q. Li, H. Yan and Y. Qi, "Long short-term memory neural network for network traffic prediction," 2017 12th International Conference on Intelligent Systems and Knowledge Engineering (ISKE), Nanjing, 2017, pp. 1-6 (Year: 2017).*

Understanding LSTM Networks (Year: 2015).*

Tarang Shah, Train, Validation and Test Sets, 2017; Studnitzer—US 20180276541 A1 (Year: 2017).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: a Peer-to-Peer Electronic Cash System," www.bitcoin.org, 2005, 9 pages.

Cheng et al., "MS-LSTM: a Multi-Scale LSTM Model for BGP Anomaly Detection," Proceedings of the 24th International Conference on Network Protocols, 2016, XP033026690, 6 pages.

European Extended Search Report in European Patent Application No. 18867293.5, dated Jan. 8, 2020, 7 pages.

Filonov et al., "Multivariate Industrial Time Series with Cyber-Attack Simulation: Fault Detection Using an LSTM-based Predictive Data Model," Cornell University Library, 2016, XP080741705, 8 pages.

International Search Report and Written Opinion in PCT Appln No. PCT/CN2018/113591, dated Jul. 30, 2019, 9 pages.

* cited by examiner

MONITORING MULTIPLE SYSTEM INDICATORS

CROSS-REFERENCE TO RELATED APPLICATIONS

This application is a continuation of PCT Application No. PCT/CN2018/113591, filed on Nov. 2, 2018, which is hereby incorporated by reference in its entirety.

BACKGROUND

Indicator monitoring is important for a stable and healthy operation of a system. In a complex system, numerous indicators need to be monitored. Normally, indicators are monitored separately. In other words, only a single indicator can be monitored at a time.

The present disclosure describes simultaneously monitoring multiple system indicators.

In an implementation, multiple system indicators to be monitored in a computing system are determined. Training data based on historical data of the multiple system indicators is obtained. A long short-term memory (LSTM) model is trained using the training data. The multiple system indicators are monitored in the computing system based on the LSTM model.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, by using a long short-term memory (LSTM) model to perform multi-indicator joint monitoring, potential co-movement anomalies between different indicators can be detected. Second, false alarms caused by single indicator monitoring can be avoided. Third, anomalies undetectable by single indicator monitoring can be detected.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
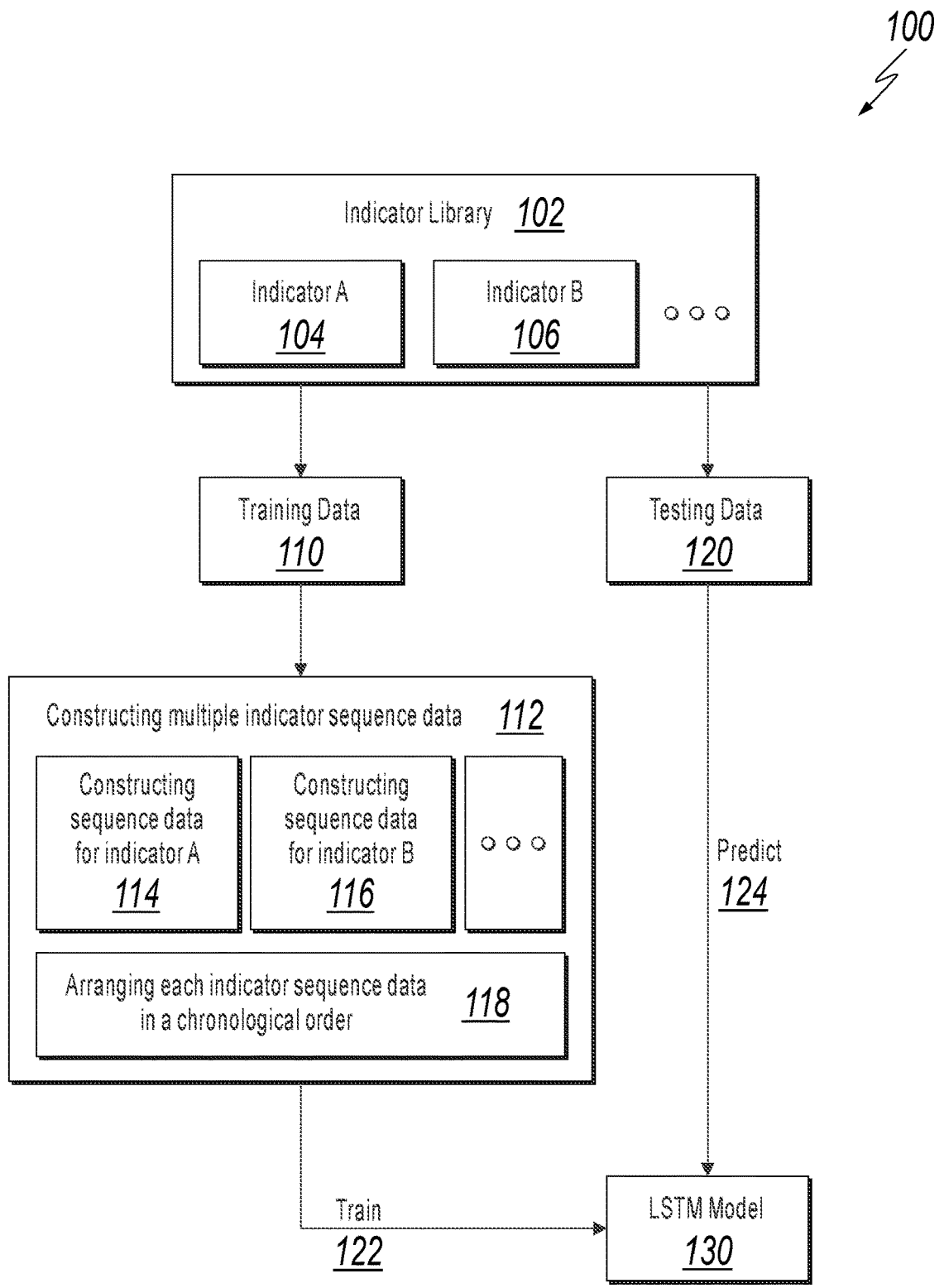
FIG. 1 is a schematic diagram illustrating an example of monitoring multiple system indicators, according to an implementation of the present disclosure.

The following detailed description describes monitoring multiple system indicators simultaneously, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Indicator monitoring is important for a stable and healthy operation of a system. In a complex system, numerous indicators need to be monitored. Normally, indicators are monitored separately. In other words, only a single indicator can be monitored at a time. For example, indicator monitoring using Gaussian distribution, k-means clustering, or isolation forest, can monitor only a single indicator at a time. Anomalies, occurring in one or more indicators but not in the monitored indicator, can be undetectable using single indicator monitoring. In many cases, there are co-movements between some indicators in a system. As a result, normal co-movements between the monitored indicator and one or more other indicators may be detected as anomalies using single indicator monitoring, which generates false alarms.

In the insurance industry, for example, indicators can include number of sold insurance policies, billing amount of sold insurance policies, number of filed claims, number of denied claims, and total settlement amount. The indicators can be monitored hourly, daily, or with other desired time intervals. Co-movements may exist between the number of sold insurance policies and the number of filed claims. For example, during some time periods (such as ALIBABA's annual "Double 11" Global Shopping Day extravaganza), due to the increase of the number of sold insurance policies, there is a high probability that the number of filed claims will increase. Simply monitoring the number of filed claims can generate false alarms with respect to a normal increase of the number of filed claims. In addition, simply monitoring the number of filed claims can result in missing reporting anomalies in the number of filed claims. For example, when there is little change in the number of filed claims while the number of sold insurance policies decreases dramatically, an anomaly is likely to occur with respect to the number of filed claims. In this example since the monitored number of filed claims appears to be constant, the anomaly in the number of filed claims may not be detected and will not be reported.

At a high-level, the described approach provides a method to automatically perform multi-indicator joint monitoring in a system using a long short-term memory (LSTM) model. Training data for input is prepared based on historical data of the multiple indicators, and is used to train the LSTM model. Since the LSTM model can learn both linear and non-linear relationships between the multiple indicators from the training data, the trained LSTM model can properly model co-movement relationships between the multiple indicators. Based on the trained LSTM model, multiple indicators can be monitored simultaneously. In doing so, potential co-movement anomalies between different indicators can be detected. In addition, false alarms and missed anomalies caused by single indicator monitoring can be avoided, thereby providing timely discovery of potential risks and anomalies in the system.

FIG. 1 is a schematic diagram 100 illustrating an example of monitoring multiple system indicators, according to an implementation of the present disclosure. For clarity of presentation, the description that follows generally describes diagram 100 in the context of the other figures in this description. Diagram 100 can include an indicator library 102, training data 110, constructing multiple indicator sequence data 112, testing data 120, and a long short-term memory (LSTM) model 130. In some implementations, diagram 100 can include additional or different (or a combination of both) components not shown in the schematic diagram. In some implementations, components can also be omitted from diagram 100.

As shown in FIG. 1, a set of indicators that need to be monitored is determined first. In some implementations, the set of indicators can be stored in an indicator library 102. For example, the set of indicators can include indicator A 104 and indicator B 106. As a particular example, in the insurance industry, the set of indicators can include at least one of number of sold insurance policies, billing amount of sold insurance policies, number of filed claims, number of denied claims, and total settlement amount. In some cases, each indicator in the set of indicators can be monitored hourly, daily, or with other desired time intervals.

After the set of indicators is determined, training data 110 can be obtained for the set of indicators. For example and in some implementations, the training data 110 can be obtained from stored historical data of the set of indicators (such as, daily number of sold insurance policies in the past 365 days or hourly number of sold insurance policies in the past 24 hours).

In some implementations, the training data 110 can be processed before being fed into a long short-term memory (LSTM) model. In other words, the training data 110 can be constructed in a format that is readable by the LSTM model. For example, multiple indicator sequence data 112 can be constructed from the historical data of the multiple indicators. The construction can be performed for one indicator at a time. In some implementations, sequence data for indicator A 114 is constructed first, and sequence data for indicator B 116 is constructed next. Then, each indicator sequence data can be arranged in a chronological order 118.

For purposes of example, indicator x represents hourly number of sold insurance policies, and indicator z represents hourly number of filed claims. First, historical data of indicator x is arranged as $x_1, x_2, \ldots, x_i, \ldots, x_{n-1}$ in a chronological order. $x_i$ indicator data of hourly number of sold insurance policies at a historical hour i. For each indicator data $x_i$, historical data within the previous time period of $x_i$ is obtained and arranged as $x_{i-t}, \ldots x_{i-1}, x_i$ in a chronological order. t represents the time period (such as 24 hours). If there is not enough historical data to fulfill the previous time period of $x_i$ (such as historical data $x_{i-t}$ is not available), number 0, for example, can be used instead. Next, historical data of indicator z is arranged as $z_1$, $z_2, \ldots, z_{n-1}, z_n$ in a chronological order. $z_i$ is indicator data of hourly number of sold insurance policies at a historical hour i. For each indicator data $z_i$, historical data within the previous time period of $z_i$ is obtained and arranged as $z_{i-t}, \ldots z_{i-1}, z_i$ in a chronological order. t represents the time period (such as 24 hours). In some implementations, if there is not enough historical data to fulfill the previous time period of $z_i$ (such as historical data $z_{i-t}$ is not available), a number 0 or some other value, for example, can instead be used.

In some implementations, $x_{i-t}, \ldots x_{i-1}, x_i$ and $z_{i-t}, \ldots z_{i-1}, z_i$ can be combined to form a matrix i as the following:

$$\begin{bmatrix} x_{i-t} & \ldots & x_{i-1} & x_i \\ z_{i-t} & \ldots & z_{i-1} & z_i \end{bmatrix}. \quad (1)$$

Based on the number of data in the historical data of indicator x and indicator z, a same number of matrices can be constructed. For example, both historical data of $x_i$, $x_2, \ldots, x_i, \ldots, xx_{n-1}, x_n$ and historical data of indicator z include n hourly data. As a result, n matrices can be constructed.

Based on the constructed matrices, training data for the LSTM model can be constructed. For example, for each constructed matrix i (that is, formula (1)), $$\begin{bmatrix} x_i \\ z_i \end{bmatrix}$$

can be used as a label dataset input to the LSTM model, and $$\begin{bmatrix} x_{i-t} & \ldots & x_{i-1} \\ z_{i-t} & \ldots & z_{i-1} \end{bmatrix}$$

can be used as a feature dataset input to the LSTM model. The constructed training data can be used to train 122 the LSTM model 130.

Once the LSTM model 130 is trained, the trained LSTM model can be used to jointly monitor multiple indicators (such as all indicators in the indicator library 102). In some implementations, testing data 120 can be obtained first for the set of indicators in the indicator library 102. For example, to monitor the set of indicators for the $j^{th}$ hour (such as the current hour), historical data of the set of indicators within the previous time period t (such as the last 24 hours) can be obtained as the testing data. The obtained testing data can be fed into the trained LSTM model to predict 124 values of the set of indicators at the $j^{th}$ hour. For each particular indicator in the set of indicators, a comparison is performed between the real-time value of the particular indicator at the $j^{th}$ hour (such as currently collected real indicator data) and the predicted value of the particular indicator at the $j^{th}$ hour (that is, predicted by the LSTM model). In some cases, an absolute value of a difference between the real-time value of the particular indicator at the $j^{th}$ hour and the predicted value of the particular indicator at the $j^{th}$ hour can be calculated. The calculated absolute values for the set of indicators can be summed up to produce a total difference number l. In some cases, the total difference number l can be compared with a predetermined threshold T (such as 100). In some cases, the predetermined threshold T can be determined from the training data. For example, for each constructed matrix i, a total difference number $l_i$ can be calculated. The predetermined threshold T can be set to a value that is ten times the average value of $l_i$. In some implementations, if l>T, it is determined that co-movement anomalies within the monitored set of indicators have occurred, and an alarm for co-movement anomalies can be raised. In some implementations, if l≤T, it is determined that no co-movement anomaly within the monitored set of indicators has occurred, and no alarm for co-movement anomalies is raised.

Figure 2:
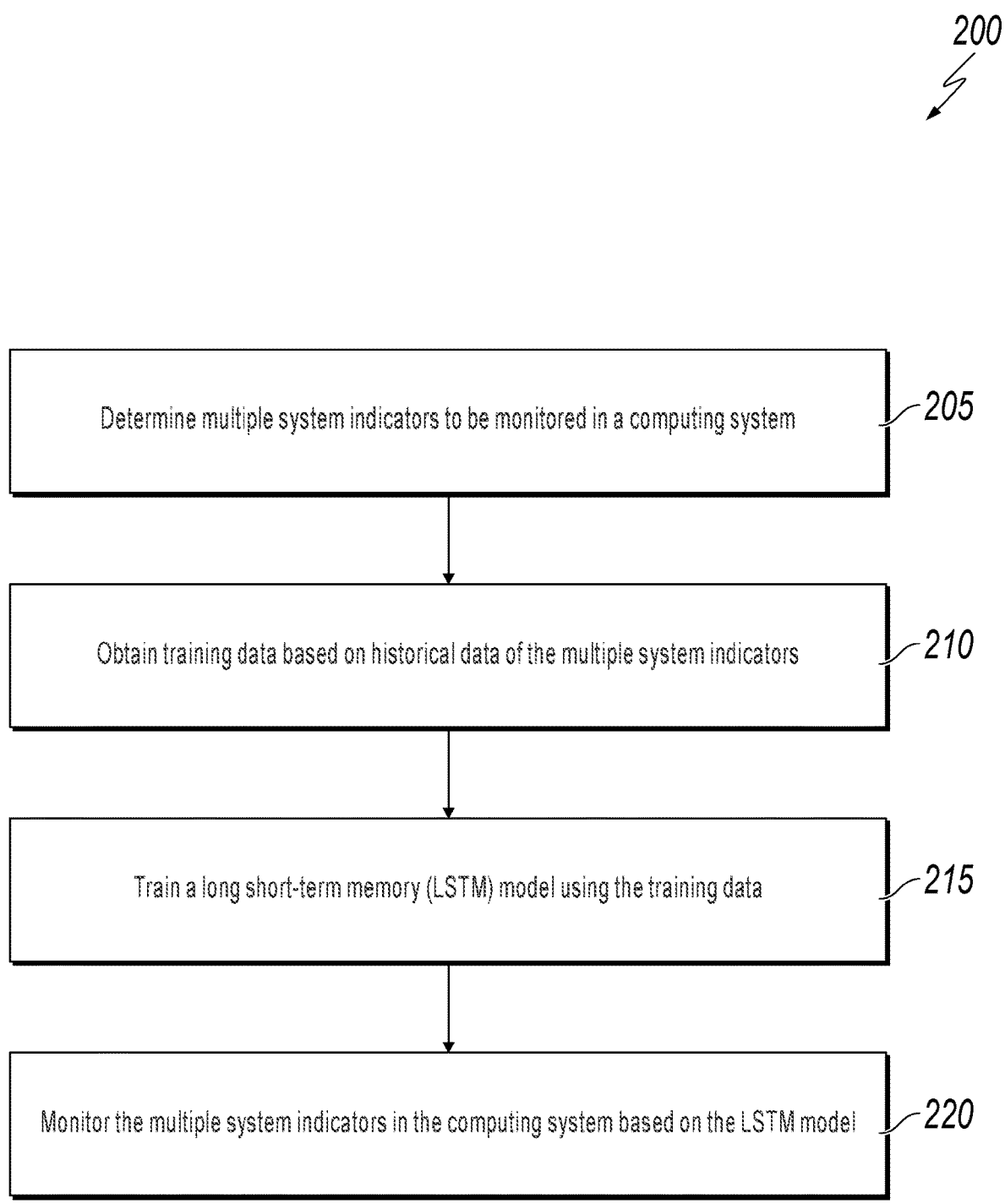
FIG. 2 is a flowchart illustrating an example of a computer-implemented method for monitoring multiple system indicators, according to an implementation of the present disclosure.

FIG. 2 is a flowchart illustrating an example of a computer-implemented method 200 for monitoring multiple system indicators, according to an implementation of the present disclosure. For clarity of presentation, the description that follows generally describes method 200 in the context of the other figures in this description. However, it will be understood that method 200 can be performed, for example, by any system, environment, software, and hardware, or a combination of systems, environments, software, and hardware, as appropriate. In some implementations, various steps of method 200 can be run in parallel, in combination, in loops, or in any order. In some implementations, various steps of method 200 can be run automatically, manually, or a combination of both automatically and manually.

At 205, multiple system indicators to be monitored in a computing system are determined. In some implementations, the multiple system indicators can be determined by a user of the computer system (such as, a system administrator). For example, in an insurance system, system indicators to be monitored can include at least one of number of sold insurance policies, billing amount of sold insurance policies, number of filed claims, number of denied claims, and total settlement amount. In some implementations, a first system indicator of the multiple system indicators can be correlated with one or more second system indicators of the multiple system indicators. In other words, there are co-movements between the first system indicator and the one or more second system indicators of the multiple system indicators. For example, during some time periods (such as ALIBABA's annual "Double 11" Global Shopping Day extravaganza), an increase of the number of sold insurance policies can cause an increase in the number of filed claims. From 205, method 200 proceeds to 210.

At 210, training data is obtained based on historical data of the multiple system indicators. In some implementations, a historical time period is determined (such as, by the user of the computer system). For example, the historical time period can be a day, a week, a month, a year, or other desired time intervals in the past. The historical data can be stored hourly, daily, or with other desired time intervals. For each particular system indicator of the multiple system indicators, historical data of the particular system indicator within the historical time period is collected. In addition, the historical data of the particular system indicator within the historical time period can be arranged in a chronological order.

For example, assuming that the historical time period includes n hours, and the multiple system indicators include a first system indicator x and a second system indicator y, historical data of the first system indicator x can be arranged as $x_1, x_2, \ldots, x_i, \ldots, x_{n-1}, x_n$ in a chronological order, and historical data of the second system indicator y can be arranged as $y_1, y^2, \ldots, y_i, \ldots, y_{n-1}, y_n$ in a chronological order. For each particular hour in the historical time period, a matrix i can be constructed as $$\begin{bmatrix} x_{i-t} & \ldots & x_{i-1} x_i \\ y_{i-t} & \ldots & y_{i-1} y_i \end{bmatrix}.$$

i is the particular hour in the historical time period, t is a data cycle (such as 24 hours), $x_i$ is historical data of the first system indicator x at the particular hour i, and $y_i$ is historical data of the second system indicator y at the particular hour i. In some cases, if there is not enough historical data to fulfill the matrix i (such as, historical data $x_{i-t}$ is not available), number 0, for example, can be used instead. For the n hours in the historical time period, n matrices can be constructed. As a result, the training data can be constructed as the n constructed matrices. From 210, method 200 proceeds to 215.

At 215, a LSTM model is trained using the training data. In some implementations, training the LSTM model using the training data can include input of the matrix i into the LSTM model, with $$\begin{bmatrix} x_i \\ y_i \end{bmatrix}$$

input as a label dataset and $$\begin{bmatrix} x_{i-t} & \ldots & x_{i-1} \\ y_{i-t} & \ldots & y_{i-1} \end{bmatrix}$$

input as a feature dataset. Since the LSTM model can learn linear and non-linear relationships between the multiple system indicators from the input training data, the trained LSTM model can properly model co-movement relationships between the multiple system indicators. From 215, method 200 proceeds to 220.

At 220, the multiple system indicators are monitored in the computing system based on the trained LSTM model. For example, testing data of the multiple system indicators can be obtained. The testing data can be historical data of the multiple system indicators within a previous time period (such as real data collected in the previous time period). In some implementations, if the historical data is stored hourly, the time period can be a day, a week, a month, a year, or other desired time intervals. If the historical data is stored daily, the time period can be a week, a month, a year, or other desired time intervals. The historical data of the multiple system indicators within the previous time period can be input into the LSTM model, to obtain predicted data of the multiple system indicators. In some cases, real-time data of the multiple system indicators (such as currently collected real indicator data of the multiple system indicators) is compared with the predicted data of the multiple system indicators to determine whether co-movement anomalies within the multiple system indicators have occurred.

For example, for each particular system indicator of the multiple system indicators, an absolute value of a difference between real-time data of the particular system indicator and predicted data of the particular system indicator is calculated. The calculated absolute values for the multiple system indicators can be summed up to produce a total difference value. In some implementations, if the total difference value exceeds a predetermined threshold, a determination is made that co-movement anomalies within the multiple system indicators have occurred. In some cases, an alarm for co-movement anomalies can be raised. In some implementations, if the total difference value does not exceed the predetermined threshold, a determination is made that no co-movement anomalies within the multiple system indicators has occurred. In some cases, no alarm for co-movement anomalies is raised.

In some implementations, a determination can be made as to whether one or more system indicators are to be added to or removed from the multiple system indicators. If it is determined that one or more system indicators are to be added to or removed from the multiple system indicators, the LSTM model needs to be retrained before being used to monitor the updated multiple system indicators. For example, updated training data can be obtained based on historical data of the updated multiple system indicators (similar to previously described step 210). The LSTM model can be retrained using the updated training data (similar to previously described step 215). In some implementations, retraining the LSTM model can be instructed by the user of the computer system. In some implementations, the LSTM model can be retrained periodically. After 220, method 200 can stop.

Figure 3:
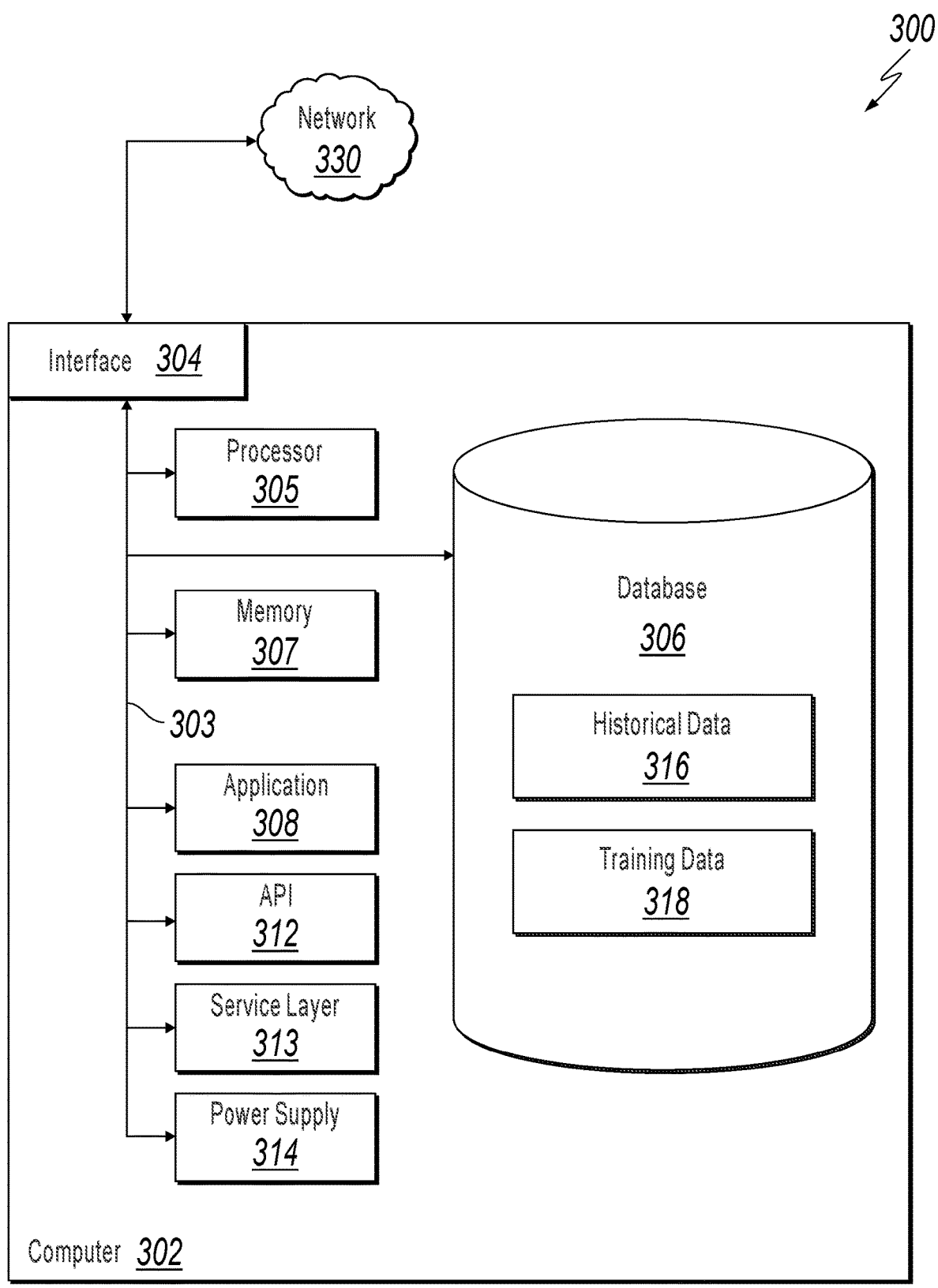
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 302 can include an input device, such as a keypad, keyboard, touch screen, another input device, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as a client, network component, a server, a database or another persistency, another role, or a combination of roles for performing the subject matter described in the present disclosure. The illustrated Computer 302 is communicably coupled with a Network 330. In some implementations, one or more components of the Computer 302 can be configured to operate within an environment, including cloud-computing-based, local, global, another environment, or a combination of environments.

At a high level, the Computer 302 is an electronic computing device operable to receive, transmit, process, store, or manage data and information associated with the described subject matter. According to some implementations, the Computer 302 can also include or be communicably coupled with a server, including an application server, e-mail server, web server, caching server, streaming data server, another server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory, conventional, or another type of database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302. As illustrated, the Database 306 holds, for example, the previously described historical data 316 and training data 318.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: determining a plurality of system indicators to be monitored in a computing system; obtaining training data based on historical data of the plurality of system indicators; training a long short-term memory (LSTM) model using the training data; and monitoring the plurality of system indicators in the computing system based on the LSTM model.

The foregoing and other described implementations can each, optionally, include one or more of the following features:

A first feature, combinable with any of the following features, wherein a first system indicator of the plurality of system indicators is correlated with one or more second system indicators of the plurality of system indicators.

A second feature, combinable with any of the previous or following features, wherein obtaining training data based on historical data of the plurality of system indicators comprises: determining a historical time period; and for each particular system indicator of the plurality of system indicators: collecting historical data of the particular system indicator within the historical time period; and arranging, in a chronological order, the historical data of the particular system indicator within the historical time period.

A third feature, combinable with any of the previous or following features, wherein the historical time period includes n predetermined time intervals, the plurality of system indicators include a first system indicator x and a second system indicator y, and the method further comprises: for each particular predetermined time interval in the historical time period, constructing $$\begin{bmatrix} x_{i-t} & \cdots & x_{i-1}x_i \\ y_{i-t} & \cdots & y_{i-1}y_i \end{bmatrix},$$

a matrix i, wherein i is the particular predetermined time interval in the historical time period, t is a data cycle, $x_i$ is historical data of the first system indicator x at the particular predetermined time interval i, and $y_i$ is historical data of the second system indicator y at the particular predetermined time interval i; and constructing the training data using the n constructed matrices.

A fourth feature, combinable with any of the previous or following features, wherein training the LSTM model using the training data comprises input of the matrix i into the LSTM model with $$\begin{bmatrix} x_i \\ y_i \end{bmatrix}$$

input as a label dataset and $$\begin{bmatrix} x_{i-t} & \cdots & x_{i-1} \\ y_{i-t} & \cdots & y_{i-1} \end{bmatrix}$$

input as a feature dataset.

A fifth feature, combinable with any of the previous or following features, wherein monitoring the plurality of system indicators in the computing system based on the LSTM model comprises: obtaining real-time data of the plurality of system indicators; obtaining historical data of the plurality of system indicators within a previous time period; inputting the historical data of the plurality of system indicators within the previous time period into the LSTM model, to obtain predicted data of the plurality of system indicators; and comparing the real-time data of the plurality of system indicators with the predicted data of the plurality of system indicators.

A sixth feature, combinable with any of the previous or following features, wherein comparing the real-time data of the plurality of system indicators with the predicted data of the plurality of system indicators comprises: for each particular system indicator of the plurality of system indicators, calculating an absolute value of a difference between the real-time data of the particular system indicator and the predicted data of the particular system indicator; summing up the calculated absolute values for the plurality of system indicators; and determining an anomaly if the summed absolute values exceeds a predetermined threshold.

A seventh feature, combinable with any of the previous or following features, further comprising: determining that one or more system indicators are to be added to or removed from the plurality of system indicators; obtaining updated training data based on historical data of the updated plurality of system indicators; and retraining the LSTM model using the updated training data.

In a second implementation, a non-transitory, computer-readable medium storing one or more instructions executable by a computer system to perform operations comprising: determining a plurality of system indicators to be monitored in a computing system; obtaining training data based on historical data of the plurality of system indicators; training a long short-term memory (LSTM) model using the training data; and monitoring the plurality of system indicators in the computing system based on the LSTM model.

The foregoing and other described implementations can each, optionally, include one or more of the following features:

A first feature, combinable with any of the following features, wherein a first system indicator of the plurality of system indicators is correlated with one or more second system indicators of the plurality of system indicators.

A second feature, combinable with any of the previous or following features, wherein obtaining training data based on historical data of the plurality of system indicators comprises: determining a historical time period; and for each particular system indicator of the plurality of system indicators: collecting historical data of the particular system indicator within the historical time period; and arranging, in a chronological order, the historical data of the particular system indicator within the historical time period.

A third feature, combinable with any of the previous or following features, wherein the historical time period includes n predetermined time intervals, the plurality of system indicators include a first system indicator x and a second system indicator y, and the operations further comprises: for each particular predetermined time interval in the historical time period, constructing $$\begin{bmatrix} x_{i-t} & \dots & x_{i-1}x_i \\ y_{i-t} & \dots & y_{i-1}y_i \end{bmatrix},$$

a matrix i, wherein i is the particular predetermined time interval in the historical time period, t is a data cycle, $x_i$ is historical data of the first system indicator x at the particular predetermined time interval i, and $y_j$ is historical data of the second system indicator y at the particular predetermined time interval i; and constructing the training data using the n constructed matrices.

A fourth feature, combinable with any of the previous or following features, wherein training the LSTM model using the training data comprises input of the matrix i into the LSTM model with $$\begin{bmatrix} x_i \\ y_i \end{bmatrix}$$

input as a label dataset and $$\begin{bmatrix} x_{i-t} & \dots & x_{i-1} \\ y_{i-t} & \dots & y_{i-1} \end{bmatrix}$$

input as a feature dataset.

A fifth feature, combinable with any of the previous or following features, wherein monitoring the plurality of system indicators in the computing system based on the LSTM model comprises: obtaining real-time data of the plurality of system indicators; obtaining historical data of the plurality of system indicators within a previous time period; inputting the historical data of the plurality of system indicators within the previous time period into the LSTM model, to obtain predicted data of the plurality of system indicators; and comparing the real-time data of the plurality of system indicators with the predicted data of the plurality of system indicators.

A sixth feature, combinable with any of the previous or following features, wherein comparing the real-time data of the plurality of system indicators with the predicted data of the plurality of system indicators comprises: for each particular system indicator of the plurality of system indicators, calculating an absolute value of a difference between the real-time data of the particular system indicator and the predicted data of the particular system indicator; summing up the calculated absolute values for the plurality of system indicators; and determining an anomaly if the summed absolute values exceeds a predetermined threshold.

A seventh feature, combinable with any of the previous or following features, the operations further comprising: determining that one or more system indicators are to be added to or removed from the plurality of system indicators; obtaining updated training data based on historical data of the updated plurality of system indicators; and retraining the LSTM model using the updated training data.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: determining a plurality of system indicators to be monitored in a computing system; obtaining training data based on historical data of the plurality of system indicators; training a long short-term memory (LSTM) model using the training data; and monitoring the plurality of system indicators in the computing system based on the LSTM model.

The foregoing and other described implementations can each, optionally, include one or more of the following features:

A first feature, combinable with any of the following features, wherein a first system indicator of the plurality of system indicators is correlated with one or more second system indicators of the plurality of system indicators.

A second feature, combinable with any of the previous or following features, wherein obtaining training data based on historical data of the plurality of system indicators comprises: determining a historical time period; and for each particular system indicator of the plurality of system indicators: collecting historical data of the particular system indicator within the historical time period; and arranging, in a chronological order, the historical data of the particular system indicator within the historical time period.

A third feature, combinable with any of the previous or following features, wherein the historical time period includes n predetermined time intervals, the plurality of system indicators include a first system indicator x and a second system indicator y, and the operations further comprises: for each particular predetermined time interval in the historical time period, constructing $$\begin{bmatrix} x_{i-t} & \ldots & x_{i-1} x_i \\ y_{i-t} & \ldots & y_{i-1} y_i \end{bmatrix},$$

a matrix i, wherein i is the particular predetermined time interval in the historical time period, t is a data cycle, $x_i$ is historical data of the first system indicator x at the particular predetermined time interval i, and $y_i$ is historical data of the second system indicator y at the particular predetermined time interval i; and constructing the training data using the n constructed matrices.

A fourth feature, combinable with any of the previous or following features, wherein training the LSTM model using the training data comprises input of the matrix i into the LSTM model with $$\begin{bmatrix} x_i \\ y_i \end{bmatrix}$$

input as a label dataset and $$\begin{bmatrix} x_{i-t} & \ldots & x_{i-1} \\ y_{i-t} & \ldots & y_{i-1} \end{bmatrix}$$

input as a feature dataset.

A fifth feature, combinable with any of the previous or following features, wherein monitoring the plurality of system indicators in the computing system based on the LSTM model comprises: obtaining real-time data of the plurality of system indicators; obtaining historical data of the plurality of system indicators within a previous time period; inputting the historical data of the plurality of system indicators within the previous time period into the LSTM model, to obtain predicted data of the plurality of system indicators; and comparing the real-time data of the plurality of system indicators with the predicted data of the plurality of system indicators.

A sixth feature, combinable with any of the previous or following features, wherein comparing the real-time data of the plurality of system indicators with the predicted data of the plurality of system indicators comprises: for each particular system indicator of the plurality of system indicators, calculating an absolute value of a difference between the real-time data of the particular system indicator and the predicted data of the particular system indicator; summing up the calculated absolute values for the plurality of system indicators; and determining an anomaly if the summed absolute values exceeds a predetermined threshold.

A seventh feature, combinable with any of the previous or following features, the operations further comprising: determining that one or more system indicators are to be added to or removed from the plurality of system indicators; obtaining updated training data based on historical data of the updated plurality of system indicators; and retraining the LSTM model using the updated training data.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method arranged to monitor operation of an insurance system, comprising:
    storing, by the insurance system, multiple system indicators in an indicator library, wherein at least one system indicator in the multiple system indicators is used to indicate a state or level of the insurance system, wherein the multiple system indicators include a number of sold insurance policies, a billing amount of sold insurance policies, a number of filed claims, a number of denied claims, and a total settlement amount, and wherein the insurance system performs multi-indicator joint monitoring using a long short-term memory (LSTM) model;
    storing, by the insurance system, historical data of the multiple system indicators in a database of the insurance system;
    determining, by the insurance system, a plurality of system indicators from the multiple system indicators to be monitored by the insurance system, wherein a first system indicator x of the plurality of system indicators is correlated with one or more second system indicators of the plurality of system indicators, and wherein the plurality of system indicators are selected by a user of the insurance system and from the indicator library using a graphical user interface (GUI) of the insurance system;
    after determining the plurality of system indicators to be monitored by the insurance system, obtaining, by the insurance system, training data based on historical data of the plurality of system indicators, wherein a historical time period is selected by the user of the insurance system using the GUI of the insurance system, and wherein a portion of the historical data of the plurality of system indicators that is within the historical time period is obtained as the training data;
    after obtaining the training data based on the historical data of the plurality of system indicators, arranging, by the insurance system, the training data in a chronological order, wherein arranging the training data in the chronological order is performed for one system indicator at a time;
after arranging the training data in the chronological order, storing, by the insurance system, the training data in the database of the insurance system;
training, by the insurance system, the LSTM model as a trained LSTM model using the training data;
simultaneously monitoring, by the insurance system, the plurality of system indicators based on the trained LSTM model, wherein simultaneously monitoring the plurality of system indicators based on the trained LSTM model comprises:
automatically obtaining real-time data of the plurality of system indicators;
automatically obtaining a second portion of the historical data of the plurality of system indicators within a second historical time period;
automatically inputting the second portion of the historical data of the plurality of system indicators within the second historical time period into the trained LSTM model;
automatically obtaining predicted data of the plurality of system indicators from the trained LSTM model; and
automatically comparing the real-time data of the plurality of system indicators with the predicted data of the plurality of system indicators; and
raising, by the insurance system, an alarm in response to detecting one or more co-movement anomalies between the first system indicator x and the one or more second system indicators, wherein a co-movement anomaly is detected when an anomaly has occurred in one of the one or more second system indicators and has not occurred in the first system indicator x.

2. The computer-implemented method of claim 1, wherein obtaining the training data based on the historical data of the plurality of system indicators comprises:
determining the historical time period; and
for each particular system indicator of the plurality of system indicators:
collecting historical data of the particular system indicator within the historical time period; and
arranging, in the chronological order, the historical data of the particular system indicator within the historical time period.

3. The computer-implemented method of claim 2, wherein the historical time period includes n predetermined time intervals, the plurality of system indicators include the first system indicator x and a second system indicator y, and the method further comprises:
for each particular predetermined time interval in the historical time period, constructing a matrix i, wherein i is the particular predetermined time interval in the historical time period, t is a data cycle, $x_i$ is historical data of the first system indicator x at the particular predetermined time interval i, and $y_i$ is historical data of the second system indicatory at the particular predetermined time interval i; and
constructing the training data using the constructed matrices.

4. The computer-implemented method of claim 3, wherein training the LSTM model using the training data comprises input of each matrix i into the LSTM model with $$\begin{bmatrix} x_i \\ y_i \end{bmatrix}$$

input as a label dataset and $$\begin{bmatrix} x_{i-t} & \ldots & x_{i-1}x_i \\ y_{i-t} & \ldots & y_{i-1}y_i \end{bmatrix},$$

input as a feature dataset.

5. The computer-implemented method of claim 1, wherein comparing the real-time data of the plurality of system indicators with the predicted data of the plurality of system indicators comprises:
for each particular system indicator of the plurality of system indicators, calculating an absolute value of a difference between the real-time data of the particular system indicator and the predicted data of the particular system indicator;
summing up, as summed absolute values, the calculated absolute values for the plurality of system indicators; and
determining the one or more co-movement anomalies when the summed absolute values exceeds a predetermined threshold.

6. The computer-implemented method of claim 1, further comprising:
determining that one or more system indicators are to be added to or removed from the plurality of system indicators to generate an updated plurality of system indicators;
obtaining updated training data based on historical data of the updated plurality of system indicators; and
in response to a user instruction, retraining the LSTM model using the updated training data.

7. A non-transitory, computer-readable medium storing one or more instructions executable by an insurance system, the one or more instructions instructing the insurance system to perform operations comprising:
storing multiple system indicators in an indicator library, wherein at least one system indicator in the multiple system indicators is used to indicate a state or level of the insurance system, wherein the multiple system indicators include a number of sold insurance policies, a billing amount of sold insurance policies, a number of filed claims, a number of denied claims, and a total settlement amount, and wherein the insurance system performs multi-indicator joint monitoring using a long short-term memory (LSTM) model;
storing historical data of the multiple system indicators in a database of the insurance system;
determining a plurality of system indicators from the multiple system indicators to be monitored by the insurance system, wherein a first system indicator x of the plurality of system indicators is correlated with one or more second system indicators of the plurality of system indicators, and wherein the plurality of system indicators are selected by a user of the insurance system and from the indicator library using a graphical user interface (GUI) of the insurance system;
after determining the plurality of system indicators to be monitored by the insurance system, obtaining training data based on historical data of the plurality of system indicators, wherein a historical time period is selected by the user of the insurance system using the GUI of the insurance system, and wherein a portion of the historical data of the plurality of system indicators that is within the historical time period is obtained as the training data;

after obtaining the training data based on the historical data of the plurality of system indicators, arranging the training data in a chronological order, wherein arranging the training data in the chronological order is performed for one system indicator at a time;

after arranging the training data in the chronological order, storing the training data in the database of the insurance system;

training the LSTM model as a trained LSTM model using the training data;

simultaneously monitoring the plurality of system indicators based on the trained LSTM model, wherein simultaneously monitoring the plurality of system indicators based on the trained LSTM model comprises:
  automatically obtaining real-time data of the plurality of system indicators;
  automatically obtaining a second portion of the historical data of the plurality of system indicators within a second historical time period;
  automatically inputting the second portion of the historical data of the plurality of system indicators within the second historical time period into the trained LSTM model;
  automatically obtaining predicted data of the plurality of system indicators from the trained LSTM model; and
  automatically comparing the real-time data of the plurality of system indicators with the predicted data of the plurality of system indicators; and raising an alarm in response to detecting one or more co-movement anomalies between the first system indicator x and the one or more second system indicators, wherein a co-movement anomaly is detected when an anomaly has occurred in one of the one or more second system indicators and has not occurred in the first system indicator x.

8. The non-transitory, computer-readable medium of claim 7, wherein obtaining the training data based on the historical data of the plurality of system indicators comprises:
  determining the historical time period; and
  for each particular system indicator of the plurality of system indicators:
    collecting historical data of the particular system indicator within the historical time period; and
    arranging, in the chronological order, the historical data of the particular system indicator within the historical time period.

9. The non-transitory, computer-readable medium of claim 8, wherein the historical time period includes n predetermined time intervals, the plurality of system indicators include the first system indicator x and a second system indicator y, and the operations further comprise:
  for each particular predetermined time interval in the historical time period, constructing a matrix i, wherein i is the particular predetermined time interval in the historical time period, t is a data cycle, $x_i$ is historical data of the first system indicator x at the particular predetermined time interval i, and $y_i$ is historical data of the second system indicator y at the particular predetermined time interval i; and constructing the training data using the constructed matrices.

10. The non-transitory, computer-readable medium of claim 9, wherein training the LSTM model using the training data comprises input of each matrix i into the LSTM model with $$\begin{bmatrix} x_i \\ y_i \end{bmatrix}$$

input as a label dataset and $$\begin{bmatrix} x_{i-t} & \cdots & x_{i-1} \\ y_{i-t} & \cdots & y_{i-1} \end{bmatrix}$$

input as a feature dataset.

11. The non-transitory, computer-readable medium of claim 7, wherein comparing the real-time data of the plurality of system indicators with the predicted data of the plurality of system indicators comprises:
  for each particular system indicator of the plurality of system indicators, calculating an absolute value of a difference between the real-time data of the particular system indicator and the predicted data of the particular system indicator;
  summing up, as summed absolute values, the calculated absolute values for the plurality of system indicators; and
  determining the one or more co-movement anomalies when the summed absolute values exceeds a predetermined threshold.

12. The non-transitory, computer-readable medium of claim 7, the operations further comprising:
  determining that one or more system indicators are to be added to or removed from the plurality of system indicators to generate an updated plurality of system indicators;
  obtaining updated training data based on historical data of the updated plurality of system indicators; and
  in response to a user instruction, retraining the LSTM model using the updated training data.

13. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    storing multiple system indicators in an indicator library, wherein at least one system indicator in the multiple system indicators is used to indicate a state or level of an insurance system, wherein the multiple system indicators include a number of sold insurance policies, a billing amount of sold insurance policies, a number of filed claims, a number of denied claims, and a total settlement amount, and wherein the insurance system performs multi-indicator joint monitoring using a long short-term memory (LSTM) model;
    storing historical data of the multiple system indicators in a database of the insurance system;

determining a plurality of system indicators from the multiple system indicators to be monitored by the insurance system, wherein a first system indicator x of the plurality of system indicators is correlated with one or more second system indicators of the plurality of system indicators, and wherein the plurality of system indicators are selected by a user of the insurance system and from the indicator library using a graphical user interface (GUI) of the insurance system;

after determining the plurality of system indicators to be monitored by the insurance system, obtaining training data based on historical data of the plurality of system indicators, wherein a historical time period is selected by the user of the insurance system using the GUI of the insurance system, and wherein a portion of the historical data of the plurality of system indicators that is within the historical time period is obtained as the training data;

after obtaining the training data based on the historical data of the plurality of system indicators, arranging the training data in a chronological order, wherein arranging the training data in the chronological order is performed for one system indicator at a time;

after arranging the training data in the chronological order, storing the training data in the database of the insurance system;

training the LSTM model as a trained LSTM model using the training data;

simultaneously monitoring the plurality of system indicators based on the trained LSTM model, wherein simultaneously monitoring the plurality of system indicators based on the trained LSTM model comprises:
    automatically obtaining real-time data of the plurality of system indicators;
    automatically obtaining a second portion of the historical data of the plurality of system indicators within a second historical time period;
    automatically inputting the second portion of the historical data of the plurality of system indicators within the second historical time period into the trained LSTM model;
    automatically obtaining predicted data of the plurality of system indicators from the trained LSTM model; and
    automatically comparing the real-time data of the plurality of system indicators with the predicted data of the plurality of system indicators; and raising an alarm in response to detecting one or more co-movement anomalies between the first system indicator x and the one or more second system indicators, wherein a co-movement anomaly is detected when an anomaly has occurred in one of the one or more second system indicators and has not occurred in the first system indicator x.

14. The computer-implemented system of claim 13, wherein obtaining the training data based on the historical data of the plurality of system indicators comprises:
    determining the historical time period; and
    for each particular system indicator of the plurality of system indicators:
        collecting historical data of the particular system indicator within the historical time period; and
        arranging, in the chronological order, the historical data of the particular system indicator within the historical time period.

15. The computer-implemented system of claim 14, wherein the historical time period includes n predetermined time intervals, the plurality of system indicators include the first system indicator x and a second system indicatory, and the operations further comprise:
    for each particular predetermined time interval in the historical time period, constructing a matrix i, wherein i is the particular predetermined time interval in the historical time period, t is a data cycle, $x_i$ is historical data of the first system indicator x at the particular predetermined time interval i, and $y_1$ is historical data of the second system indicatory at the particular predetermined time interval i; and
    constructing the training data using the constructed matrices.

* * * * *